(12) United States Patent
Gremillion, III

(10) Patent No.: US 6,745,437 B2
(45) Date of Patent: Jun. 8, 2004

(54) VALVE COVER

(76) Inventor: Jack P. F. Gremillion, III, 1959 Potwin, Baton Rouge, LA (US) 70810

( * ) Notice: Subject to any disclaimer, the term of this patent is extended or adjusted under 35 U.S.C. 154(b) by 0 days.

(21) Appl. No.: 10/293,421

(22) Filed: Nov. 12, 2002

(65) Prior Publication Data

US 2003/0066166 A1 Apr. 10, 2003

Related U.S. Application Data

(63) Continuation of application No. 09/782,357, filed on Feb. 12, 2001, which is a continuation of application No. 09/569,099, filed on May 10, 2000, now Pat. No. 6,186,742, which is a continuation of application No. 09/187,382, filed on Nov. 6, 1998, now Pat. No. 6,123,098.

(51) Int. Cl.$^7$ ................................................ F16B 4/00
(52) U.S. Cl. ........................... 16/413; 16/412; 16/414; 70/232; 70/168
(58) Field of Search ..................... 16/413, 414, 433, 16/386; 70/168, 209, DIG. 58, 232, 178, 455, 424, 427, 428, 211, 212

(56) References Cited

U.S. PATENT DOCUMENTS

| | | | | |
|---|---|---|---|---|
| 1,084,996 A | * | 1/1914 | Wright | 70/178 |
| 1,833,924 A | * | 12/1931 | Wayer | 137/382 |
| 2,206,707 A | * | 7/1940 | Shaw | 137/382 |
| 3,981,165 A | * | 9/1976 | Wersinger | 70/232 |
| 4,254,888 A | * | 3/1981 | Chandler | 220/694 |
| 4,377,245 A | * | 3/1983 | Patty | 220/822 |
| 4,405,161 A | * | 9/1983 | Young et al. | 285/80 |
| 4,570,470 A | * | 2/1986 | Gray, Sr. | 70/428 |
| 5,417,093 A | * | 5/1995 | Heiberg | 70/232 |
| 5,494,465 A | * | 2/1996 | Jenkins | 440/71 |
| 5,613,386 A | * | 3/1997 | Mire, Sr. | 70/232 |
| 6,085,557 A | * | 7/2000 | Kaye, Jr. | 70/14 |

* cited by examiner

*Primary Examiner*—Gary Estremsky
*Assistant Examiner*—Mark Williams
(74) *Attorney, Agent, or Firm*—Roy, Kiesel, Keegan & DeNicola

(57) ABSTRACT

A cover is provided, preferably for securing valves, propellers, door knobs and the like. The cover entails a hinged plate having two sections. Each section contains an indentation which, when the sections are closed, forms an aperture. A pair of arms may depend from each section in alignment with the indentations. When the sections are closed, the arms will form a hollow column in alignment with the aperture. The hollow column will also preferably contain a constriction, preferably formed by a pair of lips extending inwardly from each arm. The sections will also contain sidewalls rising from the sections opposite the hollow column if it is present. A cap is provided which will fit over the sidewalls. A tongue and groove mechanism may be provided to allow the cap to engage the sidewalls and the sections to which they are attached. A plurality of locking apertures may also be provided in the sections and the cap so that the cover may be locked with a padlock. In use the aperture or constriction will close around a thin area on the object to be covered, such as the portion of a valve behind the locking nut, the portion of a propeller hub before its flared end, or the shaft of a door knob. The sidewalls will be sized to surround the object being covered, and the cap will fit over the sidewalls, thereby enclosing the object. If the cover, is locked, the object will then be secured.

4 Claims, 6 Drawing Sheets

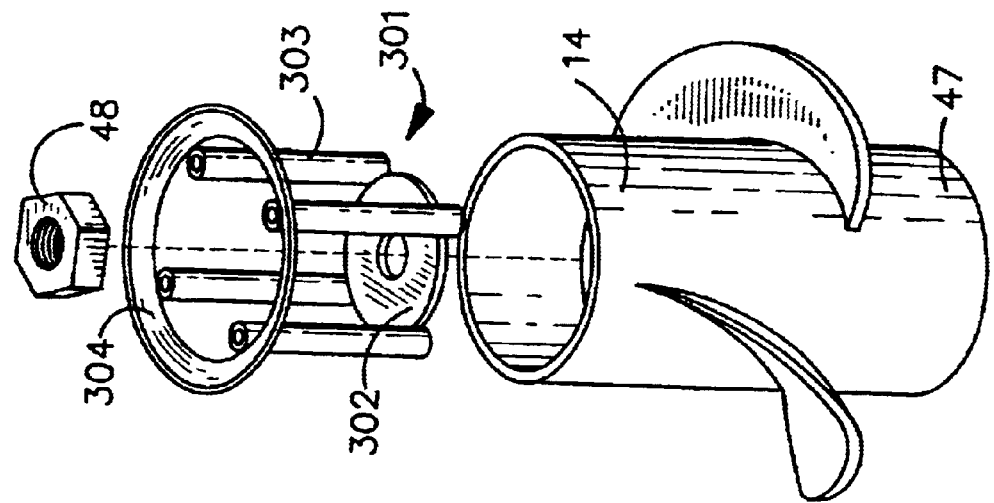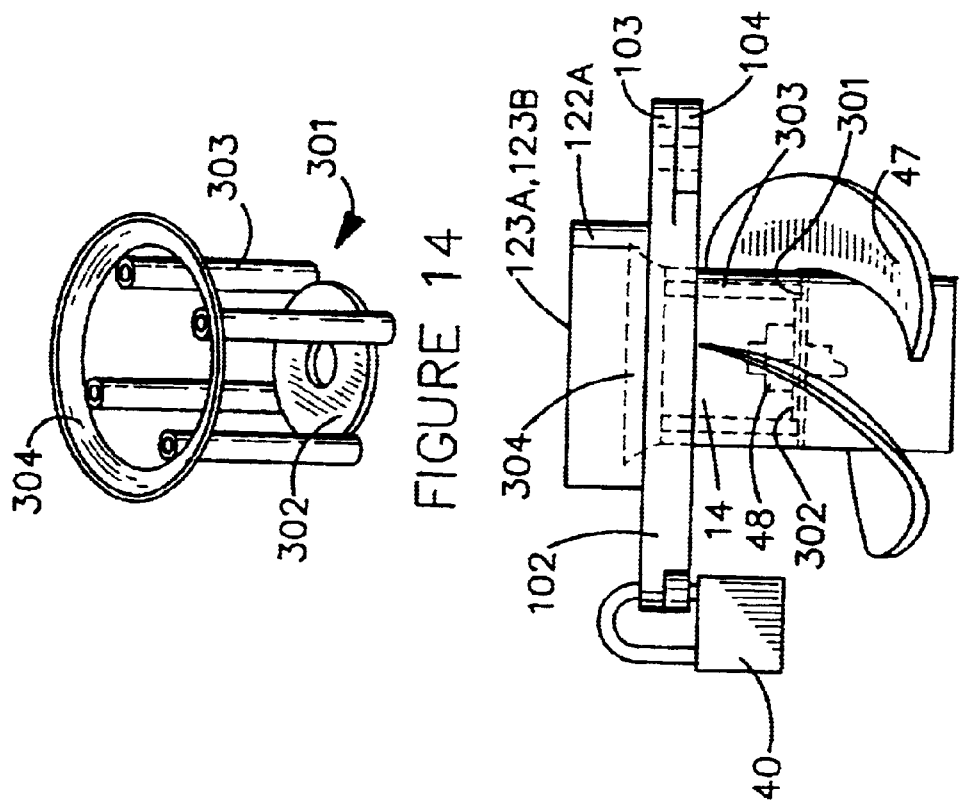

VALVE COVER

CROSS-REFERENCE

This is a continuation application of co-pending U.S. patent application Ser. No. 09/782,357 filed on Feb. 12, 2001, which is a continuation of U.S. patent application Ser. No. 09/569,099 filed on May, 10, 2000, now U.S. Pat. No. 6,186,742, and which was a continuation application of U.S. patent application No. 09/187,382 filed on Nov. 6, 1998, and which issued as U.S. Pat. No. 6,123,098, on Sep. 26, 2000, all of which are hereby incorporated by reference in their entirety.

BACKGROUND OF THE INVENTION

1. Field of the Invention

The invention relates generally to valve covers and more specifically to safety valve covers.

2. Prior Art

Numerous valve covers exist, nominally to prevent the accidental or unauthorized operation of the valves they cover. However, many of them have shortcomings which prevent these goals from being achieved. Some covers have open or partially open tops which allow objects such as screwdrivers to be inserted into the cover and used to turn the valve wheel or other control element. Other covers use the valve wheel or other control element to prevent the removal of the cover. This creates problems because it allows the cover itself to be used to engage and turn the valve.

Use of the valve wheel to prevent removal of the cover can also create safety problems, in the event of a valve failure. If the valve fails, the valve wheel and the attached valve stem may be pushed out of the valve assembly, possibly at great speed depending upon the pressure of the line. If there is a valve failure and the valve wheel is all that is retaining the valve cover, the cover will be ejected with the valve wheel and stem, adding to the weight of the projectile.

Another problem in the prior art arises with the valves themselves. Plant environments can have hundreds and even thousands of valves within a relatively small space along pipe systems that can be mazelike in complexity. Many of these valves are similar in appearance and can be difficult to differentiate from one another simply by looking at the valves. In some plants, opening or closing the wrong valve may adversely effect environmental, health, or safety conditions at the plant and the surrounding area.

Another problem that the present invention is designed to address lies in the unrelated field of outboard motor propellers. Propellers start at $75 to $100 and rise to several hundred dollars in value, particularly for those made from stainless steel. In an outboard motor, they are typically attached by a single nut. The nut is exposed and can be removed in a matter of seconds with an air wrench. Once the nut is removed, the propeller may be simply slipped from the motor. The ease with which propellers may be removed makes them a favorite target for thieves. The problem is exacerbated by the frequency with which boats are stored in relatively unsecured areas, such as parking lots at motels or open boathouses on public lakes. The inventor is not aware of any commercially available lock designed to secure outboard motor propellers. In view of the foregoing shortcomings in the prior art, what is desired is a valve cover and propeller lock that meets the following objectives.

OBJECTS OF THE INVENTION

It is an object of the invention to prevent the unauthorized operation of valves.

It is another object of the invention to prevent the unintentional operation of valves.

It is another object of the invention to secure the valve stem in the event of a valve failure.

It is another object of the invention to identify valves.

It is another object of the invention to provide warnings about operation of valves.

It another object of the invention to prevent the theft of outboard motor propellers.

SUMMARY OF THE INVENTION

The invention comprises a plate having two sections and a cap. Each section of the plate has an indentation along its inner edge that forms an aperture when the sections are placed together in a closed position. The sections also preferably have an arm depending from each section with an inwardly facing lip at the distal end of the arm. When the sections are in the closed position, the arms come together to form a hollow column aligned with the aperture and the lips come together to form a constriction in the column. On the opposite side of each section are a set of sidewalls that form a circle when the sections are in the closed position. A cap fits over the sidewalls when the sections are in the closed position. The cap prevents the sections from opening while it is in place. It also prevents access to the objects contained within the cover. A tongue and groove assembly may be provided to retain the cap in place, and a plurality of lock apertures may be provided to allow the sections and the cap to be locked together. Alternatively, threads may be used for this purpose. By appropriately sizing the aperture in the plate or the constriction in the column, the cover will fit behind the locking nut of a valve assembly, around the hub of an outboard motor propeller, or around the shaft of a door knob. In the case of a valve assembly, the aperture or constriction should be sized to prevent the locking nut from passing through. With a propeller, the aperture or constriction should be sized to prevent the passage of the flared end of the hub. For a door knob, the aperture or constriction should prevent the passage of the knob itself.

BRIEF DESCRIPTION OF THE DRAWINGS

FIG. 14 is a perspective view of a preferred embodiment of an adapter.

FIG. 15 is an exploded perspective view of a preferred embodiment of an adapter during installation on a propeller without a flared end.

FIG. 16 is a side view of a preferred embodiment of a locked two piece cover enclosing a propeller hub that has been fitted with a preferred embodiment of an adapter.

DETAILED DESCRIPTION OF THE BEST MODE

Figure 1:
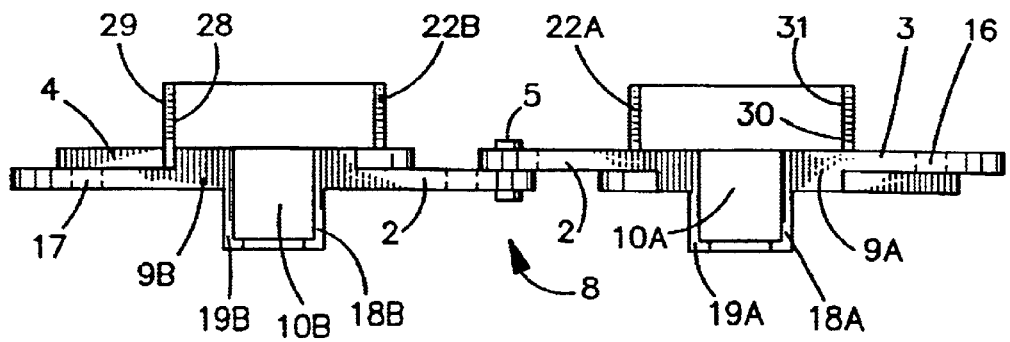
FIG. 1 is a side view of one preferred embodiment of the cover with the sections in the open position before the installation of the cap.
Figure 2:
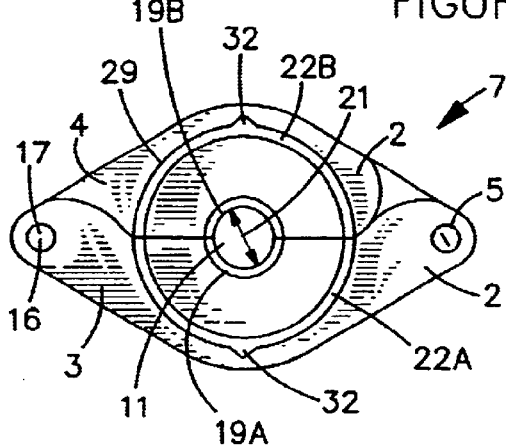
FIG. 2 is a top view of one preferred embodiment of the cover with the sections in the closed position before the installation of the cap.
Figure 3:
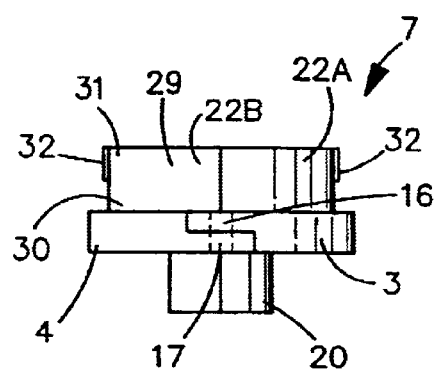
FIG. 3 is an end view of a preferred embodiment of the cover with the sections in the closed position before the installation of the cap.
Figures 4, 5:
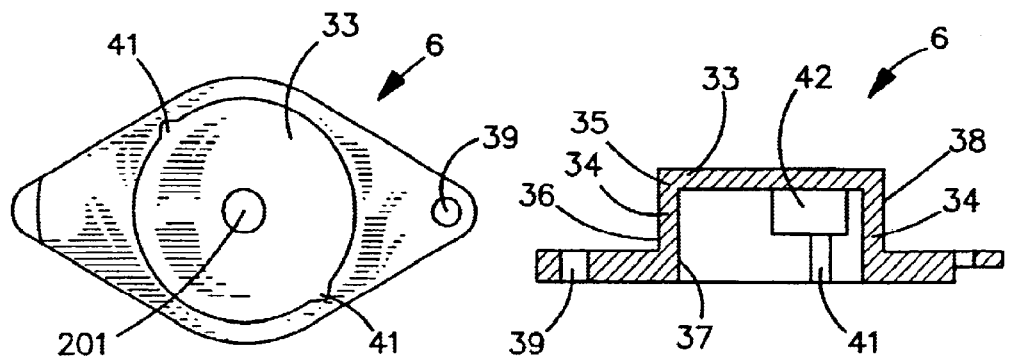
FIG. 4 is a bottom view of a preferred embodiment of the cap having a stem valve aperture.
FIG. 5 is a side cut-away view of a preferred embodiment of a cap.
Figure 6:
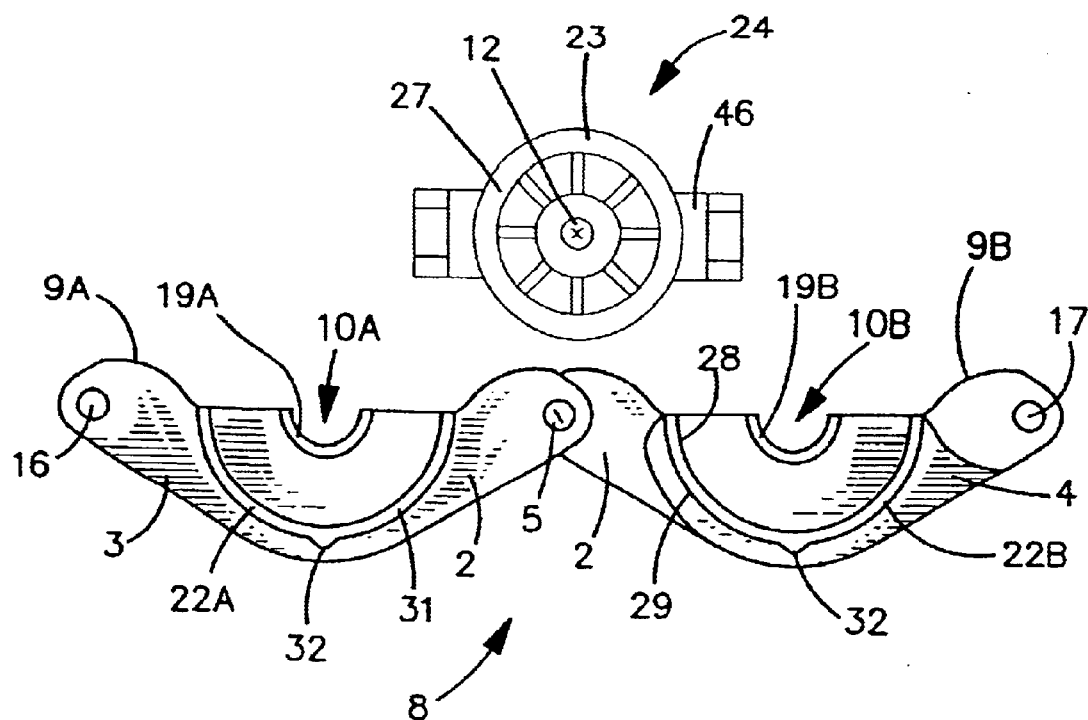
FIG. 6 is a top view of a preferred embodiment of a cover with its sections in the open position and being positioned over a wheel valve before installation of the cap.
Figure 7:
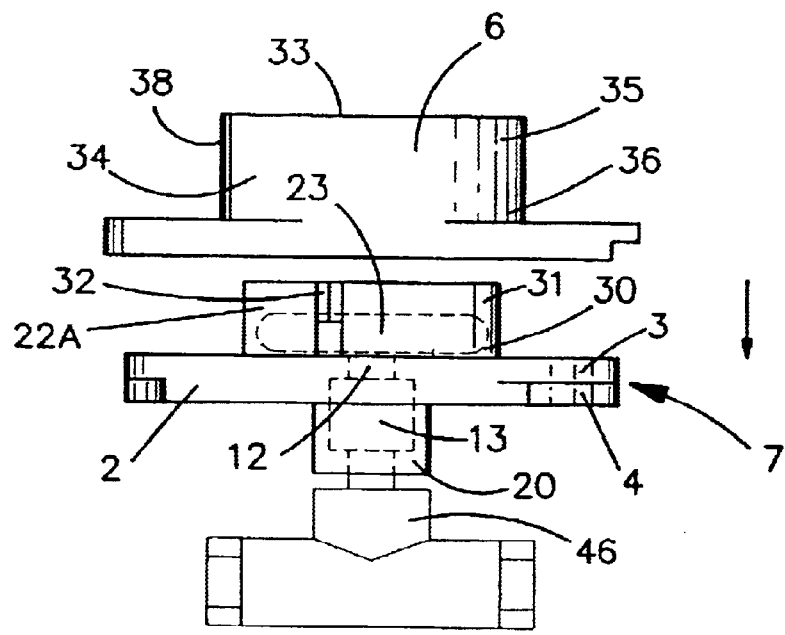
FIG. 7 is a side view of a preferred embodiment of a cover with its sections in the closed position and in engagement with a wheel valve and with a cap being positioned over the sidewalls.
Figure 8A:
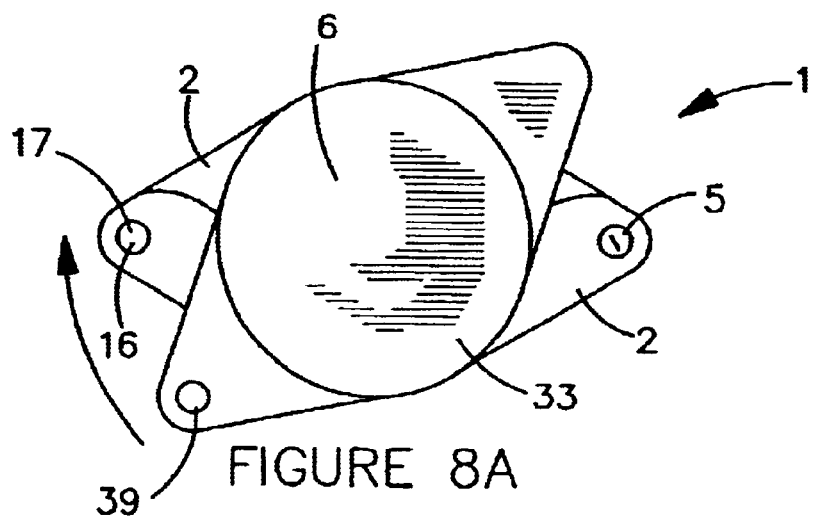
FIG. 8A is a top view of a preferred embodiment of a cover with its cap positioned over the sidewalls but with its locking apertures out of alignment.
Figure 8B:
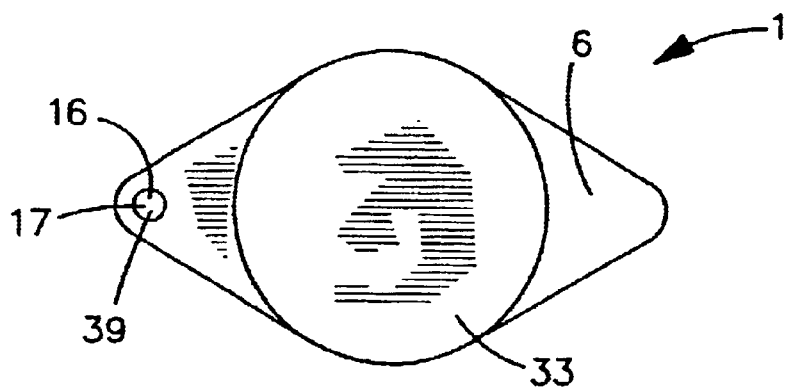
FIG. 8B is the view shown in FIG. 8A with the cap rotated to align the locking apertures.
Figure 11:
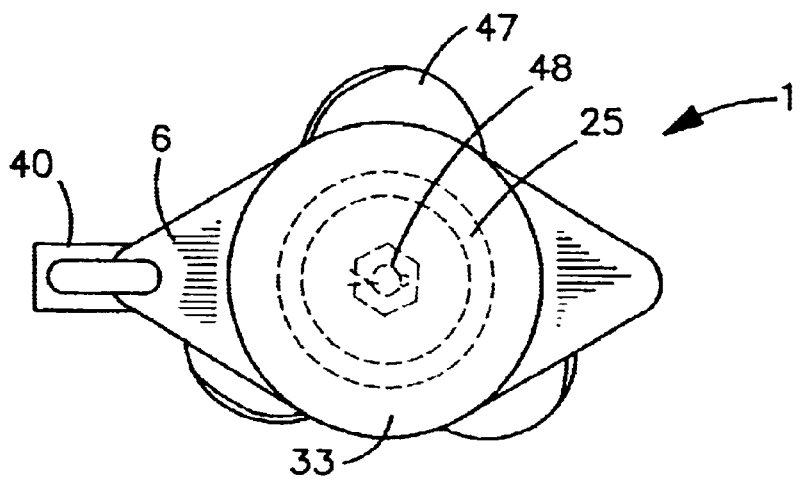
FIG. 11 is a top view of a preferred embodiment of a locked cover enclosing the flared end of a propeller hub.
Figure 9:
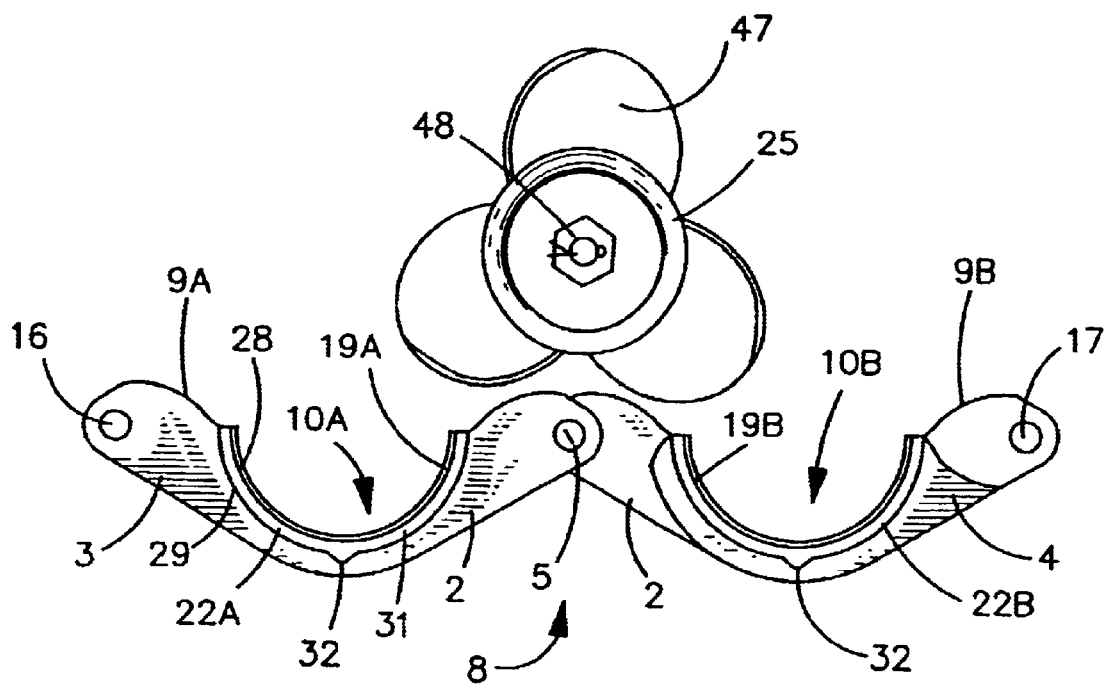
FIG. 9 is a top view of a preferred embodiment of a cover with its sections in the open position and being positioned over a propeller hub and before installation of the cap.

The invention is a cover 1. Cover 1 comprises a plate 2 which is comprised of a first section 3 and a second section 4. First section 3 and second section 4 are in releasable engagement with each other. This can be accomplished in a variety of ways. First section 3 and second section 4 may be attached by hinge(s) 5, bolt(s), pin(s), screw(s), or other conventional attachment means. First section 3 and second section 4 may also be held together by a cap 6 (discussed below). First section 3 and second section 4 have two positions, a closed position 7, illustrated in FIGS. 2 and 7, and an open position 8, illustrated in FIGS. 1 and 9. The inner edges 9A and B of each section 3 and 4 contain an indentation 10A and B. When sections 3 and 4 are in closed position 7, indentations 10A and B form an aperture 11. Depending on the application, aperture 11 may be sized to fit a valve stem 12, a valve assembly locking nut 13, a propeller hub 14 or a door knob shaft.

In a preferred embodiment, first section 3 contains a first locking aperture 16 and second section 4 contains a second locking aperture 17. When section 3 and section 4 are in closed position 7, first locking aperture 16 and second locking aperture 17 should be aligned.

In another preferred embodiment, arms 18A and B depend from each section 3 and 4. Lips 19A and B extend inwardly from each arm 18A and B. When sections 3 and 4 are in closed position 7, arms 18A and B form a hollow column 20 and lips 19A and B form a constriction 21 within column 20. Depending on the application, constriction 21 may be sized to fit valve stem 12, valve assembly locking nut 13, propeller hub 14, or a door knob shaft.

Sidewalls 22A and B extend from each section 3 and 4, on the side opposite column 20, if it is present. Sidewalls 22A and B should be sized to substantially surround the object being enclosed by cover 1 when sections 3 and 4 are in closed position 7 and aperture 11 or constriction 21 has engaged valve stem 12, valve assembly locking nut 13, propeller hub 14, or a door knob shaft. The object to be enclosed will typically be the control member 23 of valve assembly 24, the flared end 25 of propeller hub 14, or a door knob. Valve assembly control member 23 will typically be a valve wheel 27, but it may include other structures such as a lever (not shown) or an arm (also not shown).

Sidewalls 22A and B have an inner surface 28, an outer surface 29, a first end 30 proximate section 3 or 4, and a second end 31 distal from section 3 or 4. In a preferred embodiment, at least one tongue 32 protrudes from outer surface 29, preferably on both sidewalls 22A and B. Tongue 32 should preferably not extend the full length from first end 30 to second end 31. Preferably, tongue 32 should only extend along that portion of sidewalls 22 A and B closest to second end 31.

A cap 6, sized to fit over sidewalls 22A and B when sections 3 and 4 are in closed position 7, is provided. Cap 6 has a top 33 and sides 34 depending from and substantially perpendicular to top 33. Sides 34 have a first end 35 proximate to top 33 and a second end 36 distal from top 33. Sides 34 also have an inner surface 37 and an outer surface 38. Cap 6 is configured to releasably engage sections 3 and 4 when they are in closed position 7, thereby preventing their return to open position 8. This can be accomplished simply by sizing sides 34 to fit snugly over sidewalls 22 A and B. Another possible configuration is to provide cap 6 with a third locking aperture 39 and structuring cap 6 so that third locking aperture 39 will be aligned with first locking aperture 16 and second locking aperture 17 when sections 3 and 4 are in closed position 7 and cap 6 is in place over sidewalls 22A and B. A lock 40 may be placed through locking apertures 16, 17, and 39, thereby securing sections 3 and 4 in closed position 7 and preventing the removal of cap 6 from sidewalls 22A and B.

Cap 6 may also be provided with a pair of grooves, first groove 41 and second groove 42, for engaging sections 3 and 4. Grooves 41 and 42 are preferably contained in inner surface 37. First groove 41 should be wide enough and deep enough to receive tongue 32. First groove 41 should preferably extend from second end 36 of side 34 to a point in the middle of side 34. Second groove 42 should preferably be located between first end 35 and second end 36 of side 34, and should be in communication with first groove 41. Second groove 42 should be deep enough to receive tongue 32, and it should be wider than first groove 41. Tongue 32 and grooves 41 and 42 should be positioned to align when cap 6 is inserted over sidewalls 22A and B. First groove 41, second groove 42, and tongue 32 should be positioned and sized lengthwise relative to each other so that tongue 32 may be passed through first groove 41 and into second groove 42 so that all of tongue 32 is contained within second groove 42. In a preferred embodiment, there are at least two sets of tongues 32 and grooves 41 and 42. In operation, tongue 32 will fit into first groove 41 as cap 6 is placed over sidewalls 22A and B. As cap 6 is advanced, tongue 32 will pass through first groove 41 into second groove 42. If cap 6 is rotated about sidewalls 22, tongue 32 will slide within second groove 42 and will move out of alignment with first groove 41. In this position, tongue 32 will not be able to reenter first groove 41, and cap 6 will be retained on sidewalls 22A and B.

Alternatively cap 6 and sidewalls 22A and B may be provided with threads (not shown) which may be used to retain cap 6 on sidewalls 22A and B.

Cap 6 may be provided with a stem valve aperture 201 for use with a stem valve. Stem valves typically have a fixed threaded stem on which a threaded wheel rides. They can be contrasted with wheel valves in that wheel valves usually cause the gate or other closure structure to rotate into and out of the closed position. In stem valves, the wheel rises or falls on the threaded stem as it is rotated. The gate or other closure structure moves linearly with the wheel. In stem valves it is linear movement, rather than rotation, which moves the gate or other closure structure into and out of the closed position. When cover 1 is to be used to secure a stem valve, stem valve aperture 201 should be positioned and sized to allow the stem to pass through cap 6 when cover 1 is enclosing control member 23 of valve assembly 24.

Figure 10:
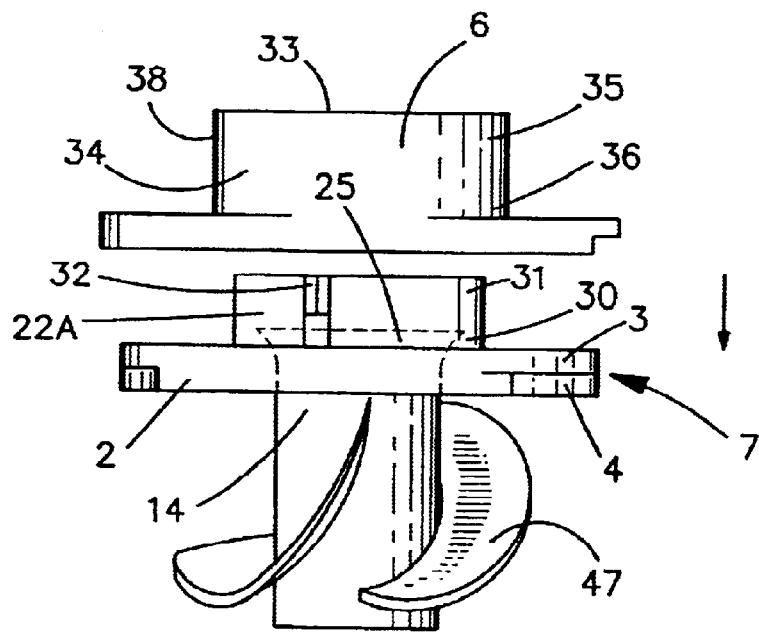
FIG. 10 is a side view of a preferred embodiment of a cover with its sections in the closed position and in engagement with a propeller hub and with a cap being positioned over the sidewalls.
Figure 12:
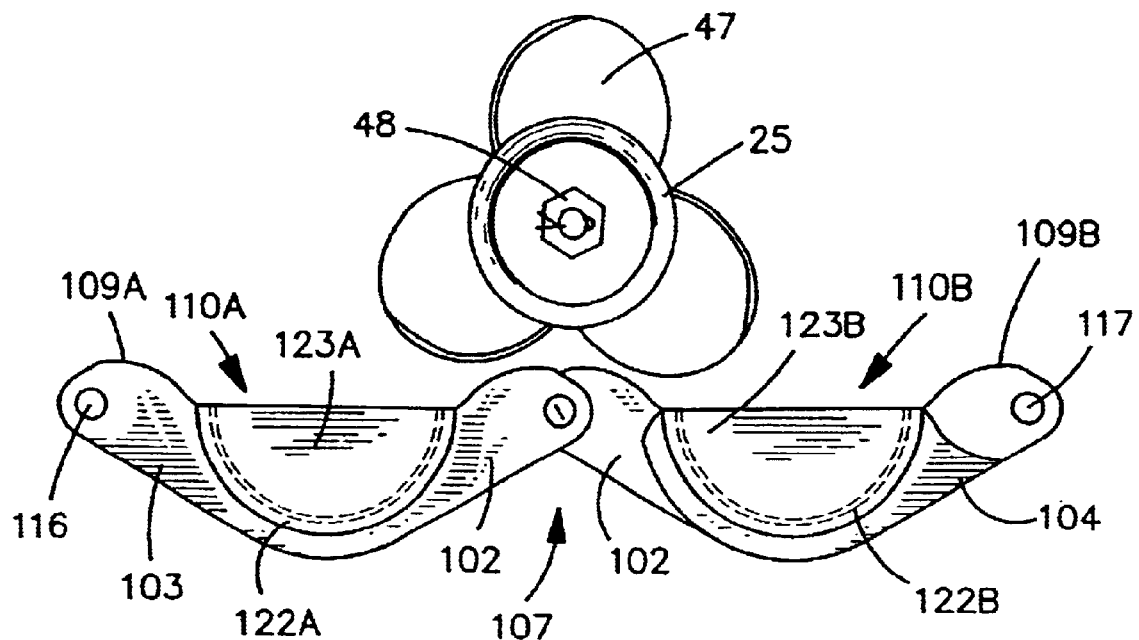
FIG. 12 is a top view of a preferred embodiment of a two piece cover with its sections in the open position and being positioned over a propeller hub.
Figure 13:
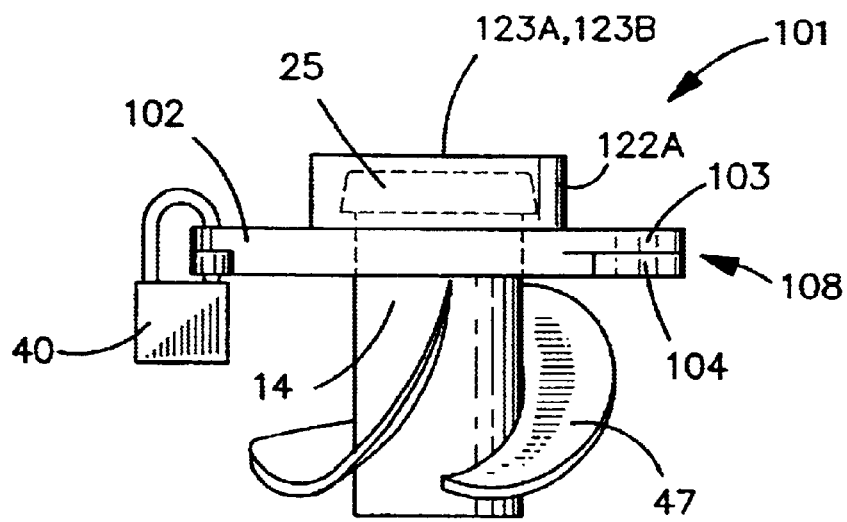
FIG. 13 is a side view of a preferred embodiment of a locked two piece cover enclosing the flared end of a propeller hub.

In an embodiment particularly suited for use as a lock for boat propeller 47, a cover 101 is comprised of a plate 102 having a first section 103 and a second section 104. Sections 103 and 104 are in releasable engagement with each other, preferably accomplished substantially as set forth above with respect to sections 3 and 4. Sections 103 and 104 have two positions, an open position 107, illustrated in FIG. 9, and a closed position 108, illustrated in FIG. 10. The inner edges 109A of each section 103 and 104 contain an indentation 110A and 110B. When sections 103 and 104 are in closed position 108, indentations 110A and 110B form a hub aperture. The hub aperture should be sized to fit a propeller hub 14. In this embodiment, first section 103 should contain a first locking aperture 116 and second section 104 should contain a second locking aperture 117. When sections 103 and 104 are in closed position 108, locking apertures 116 and 117 should be aligned. Each locking aperture 116 and 117 should be sized to receive a padlock. Also in this embodiment, sidewalls 122A and 122B extend generally perpendicularly from sections 103 and 104. Sidewalls 122A and 122B should be sized to substantially surround the flared end 25 of propeller hub 14 when the hub aperture is positioned around propeller hub 14 and sections 103 and 104 are in closed position 108. A first cap section 123A and second cap section 123B extend generally perpendicularly from sidewalls 122A and 122B, respectively. Cap sections 123A and 123B should be sized and positioned so that cap section 123A and 123B substantially enclose flared end 25 of propeller hub 14 when the hub aperture is positioned around propeller hub 14 and sections 103 and 104 are in closed position 108.

One use of cover 1 will be as a valve cover for use with valve assembly 24. Valve assembly 24 will typically have a locking nut 13, a valve stem 12, a valve control member 23, such as valve wheel 27, and a valve housing 46. In operation, sections 3 and 4 are positioned around valve assembly 24 while sections 3 and 4 are in open position 8, so that either aperture 11 or constriction 21 will be positioned behind locking nut 13. When sections 3 and 4 are moved into closed position 7, the diameter of aperture 11 or constriction 21 will prevent the passage of locking nut 13. Sidewalls 22A and B will extend upward from sections 3 and 4 so that they surround control member 23. Cap 6 will then be placed over sidewalls 22A and B, enclosing valve control member 23 within cover 1. Cap 1 may be held in place by tongue 32 and grooves 41 and 42, if an embodiment having those elements is used. Also, if an embodiment using locking apertures 16, 17, and 39 is used, cover 1 may be locked in place.

It may be useful to provide cover 1 with an envelope, particularly when cover 1 is used as a valve cover. The envelope is preferably provided on cap 6 and may be used to hold materials identifying valve assembly 24 or providing warning information regarding valve assembly 24. The envelope may be attached to cap 6 by conventional means such as tacking, screwing, welding, or gluing. In a preferred embodiment, the envelope is constructed of a clear plastic in order to permit the material contained in the envelope to be read through the envelope. In another embodiment, warning and identifying information may be given on hang tags. Placards containing warning information may also be attached directly to cap 6. Cover 1 should preferably contain at least one hang tag aperture sized to receive hang tags. Other apertures, such as locking apertures 16, 17, and 39 may be used for this purpose if desired. Frangible tabs may also be placed in locking apertures 16, 17, and 39 to indicate whether cover 1 has been opened.

The preferred embodiment of this invention provides a significant advantage over the prior art in that the engagement with locking nut 13 will prevent cover 1 from being used to turn valve control member 23. The diameter of aperture 11 or constriction 21 will prevent cover 1 from being pulled into contact with valve control member 23. Similarly, contact between aperture 11 or constriction 21 and valve housing 46 will prevent cover 1 from being pushed into contact with valve control member 23. Because cover 1 cannot contact valve control member 23, it cannot be used to turn valve control member 23. Thus, this design will be more effective at deterring vandalism or determined incompetence than the valve covers in the prior art.

Another advantage that the preferred embodiment provides involves safety. In the event of a valve failure, valve stem 12 may be ejected from valve assembly 24, often at high speeds. In such conditions, valve stem 12 may pose a danger to persons and property in the vicinity of the valve. Covers that rely upon valve control member 24 to retain them in place will not prevent the ejection of valve stem 12 in the event of a valve failure. Instead, the cover will be ejected with valve stem 12, merely adding to the weight of the projectile. Unlike the prior art, the preferred embodiment of cover 1 is secured by locking nut 13 and valve housing 46. Thus, in the event of a valve failure, cover 1 will not lose its attachment to valve assembly 24. Therefore, cover 1 will be able to prevent the ejection of valve stem 12 in the event of a valve failure.

Another use of cover 1 will be as a lock for a boat propeller 47. Propeller 47 will usually have a central hub 14, and hub 14 will usually have a flared end 25. Propeller 47 is mounted on a shaft and typically secured to the shaft solely by a single nut 48 contained within hub 14. In this embodiment, aperture 11 or constriction 21 is sized to fit around hub 14 but not flared end 25. Thus, sections 3 and 4 may be closed over hub 14 but will not slide over flared end 25 while they are in closed position 7. Sidewalls 22A and B and cap 6 are sized so that cap 6 can be placed over sidewalls 22A and B when sections 3 and 4 are in closed position 7 around hub 14. This will enclose flared end 25 within cover 1. If locking apertures 16, 17, and 39 are used, cover 1 may be locked in this position, thereby denying thieves access to nut 48 and preventing the removal of propeller 47.

In another embodiment, cover 101, may also be used as lock for a boat propeller 47. In this embodiment, a hub aperture is sized to fit around hub 14 but not flared end 25. Thus, sections 103 and 104 may be closed over hub 14 but will not slide over flared end 25 while they are in closed position 107. When sections 103 and 104 are in closed position 107, sidewalls 122A and 122B will at least substantially surround flared end 25 and cap sections 123A and 123B will substantially enclose flared end 25 within cover 101. Cover 101 may be locked in place using locking apertures 116 and 117, thereby denying thieves access to nut 48 and preventing the removal of propeller 47.

Although most propellers 47, have a flared end 25, there are some that do not. The inventor contemplates using an adapter 301 to allow the hub aperture to engage the propeller hub 14. Adapter 301 comprises a ring 302 preferably having a plurality of arms 303 extending linearly from ring 302. The interior of propeller 47 is usually provided with fins (not shown) which engage the propeller shaft. Arms 303 should preferably be sized and positioned to align with these fins in order to maximize the strength of arms 303. At the end of arms 303 distal from ring 302 is a flared portion 304. Flared portion 304 is wider than the hub aperture and may take many different forms. It may be a circle or a bar, or it may simply comprise a plurality of outwardly extending elements attached to the ends of arms 303. The only requirement for flared portion 304 is that it be too wide to pass through the hub aperture when sections 23 A and B or 123 A and B are in closed position 8 or 108, respectively.

In operation, adapter 301 is installed by removing nut 48. There will usually be a washer (not shown) behind nut 48 which should be removed as well. Ring 302 should be placed over the propeller shaft and the washer and the nut reattached. Alternatively, ring 302 may be used in place of the washer. This will secure ring 302 behind nut 48. Arms 303 should be sized to extend out beyond the end of hub 14, thereby positioning flared portion 304 beyond the end of hub 14 as well, although arms 303 should preferably be sized to position flared portion 304 immediately adjacent to the end of hub 14 or only slightly displaced therefrom. When the hub aperture engages hub 14, flared portion 304 of adapter 301 will prevent cover 1 or 101 from being removed from a propeller 48 that does not have a flared end 25.

Another application for cover 1 will be as a cover for a door knob. In this embodiment, aperture 11 or constriction 21 is sized to fit around a door knob shaft but not the door knob when sections 3 and 4 are in closed position 7. Sidewalls 22A and B and cap 6 are sized so that cap 6 can be placed over sidewalls 22A and B when 3 and 4 are in closed position around the door knob shaft. This will enclose the door knob within cover 1. If locking apertures 16, 17, and 39 are used, cover 1 may be locked in this position, thereby denying access to the door knob.

Other uses, embodiments, and applications of the invention, equivalent to that disclosed herein, will occur to those skilled in the art, and are intended to be included within the scope and spirit of the following claims.

I claim:

1. A cover for securing a door knob having a door knob shaft attaching said door knob to a door, said cover comprising:

a plate comprising a first section and a second section in releasable engagement with said first section, said first section containing a first locking aperture, said second section containing a second locking aperture, said sections having an open position and a closed position, said plate containing a door knob shaft aperture when said sections are in said closed position, said aperture positioned and sized to engage said door knob shaft at a point between said door knob and said door when said sections are in said closed position, said aperture further sized to prevent the passage of said door knob or said door when said sections are in said closed position;

sidewalls extending from said plate, said sidewalls sized and positioned to substantially surround said door knob when said sections are in said closed position and said aperture has engaged said door knob shaft;

a cap containing a third locking aperture, said cap sized to fit over said sidewalls when said sections are in said closed position, whereby said door knob may be enclosed within said cover, said cap configured to releasably engage said sections of said plate when said sections are in said closed position, whereby said cap will prevent said sections from returning to said open position while said cap and said sections are engaged, and wherein said first section, said second section, and said cap are configured to align said first locking aperture, said second locking aperture, and said third locking aperture when said first section and said second section are in said closed position and said cap is engaged with said sections.

2. A cover according to claim 1 wherein said cap is further configured to releasably engage said sidewalks to prevent the removal of said cap while said cap and said sidewalls are engaged.

3. A cover according to claim 2 wherein said sidewalls have an inner surface and an outer surface, said outer surface of said sidewalls having at least one tongue; and wherein said cap has a top and sides substantially perpendicular to and depending from said top, said sides having an end proximate said top and an end distal from said top, said sides having an inner surface and an outer surface, said inner surface of said sides containing at least one pair of grooves, said pair of grooves comprising a first groove and a second wider groove in communication with said first groove, said first groove extending from said distal end of said sides to said second groove, said first groove and said second groove sized to receive said tongue, whereby said releasable engagement between said cap and said sidewalls may be provided by aligning said tongue with said first groove as said cap is positioned over said sidewalls, advancing said cap until said tongue is positioned within said second groove, and rotating said cap until said first groove and said tongue are no longer aligned.

4. A cover according to claim 1 wherein said releasable engagement between said first section and said second section is provided by at least one hinge, whereby said sections may pivot between said open position and said closed position.

* * * * *